(12) United States Patent
Lin et al.

(10) Patent No.: US 7,464,982 B1
(45) Date of Patent: Dec. 16, 2008

(54) VEHICLE PROTECTING COVER DEVICE

(76) Inventors: Xiaogu Lin, 61-40 Saunders St., Unit C31, Rego Park, NY (US) 11222; Lan Jin, 61-40 Saunders St., Unit C31, Rego Park, NY (US) 11222; YuLian Zhao, 77 Bed, 9 Avenue, North York, Ontario (CA) M2H 1K7

( * ) Notice: Subject to any disclaimer, the term of this patent is extended or adjusted under 35 U.S.C. 154(b) by 21 days.

(21) Appl. No.: 11/621,906

(22) Filed: Jan. 10, 2007

(51) Int. Cl.
 *B60J 11/00* (2006.01)
(52) U.S. Cl. .................................... 296/136.01
(58) Field of Classification Search ......... 296/136.01, 296/136.04, 136.07, 136.1, 136.13; 135/88.01, 135/88.03, 88.05, 88.07; 160/238, 351
See application file for complete search history.

(56) References Cited

U.S. PATENT DOCUMENTS

| | | | | |
|---|---|---|---|---|
| 1,999,171 A | * | 4/1935 | Bryant | 150/166 |
| 2,871,931 A | * | 2/1959 | Hastings | 160/21 |
| 4,834,446 A | * | 5/1989 | Tung-Chow | 296/136.03 |
| 4,848,823 A | | 7/1989 | Flohr et al. | |
| 4,958,881 A | * | 9/1990 | Piros | 296/98 |
| 5,176,421 A | | 1/1993 | Fasiska | |
| 5,303,972 A | | 4/1994 | Heider | |
| 5,456,515 A | * | 10/1995 | Dang | 296/95.1 |
| 5,516,181 A | | 5/1996 | Thompson | |
| 5,597,196 A | | 1/1997 | Gibbs | |
| 5,597,197 A | | 1/1997 | Mowar et al. | |
| 6,131,643 A | | 10/2000 | Cheng et al. | |
| 6,513,858 B1 | | 2/2003 | Li et al. | |
| 6,964,446 B2 | | 11/2005 | Porter | |
| 6,981,509 B2 | | 1/2006 | Sharapov | |
| 7,311,112 B2 | * | 12/2007 | Pacheco | 135/88.07 |
| 2001/0045758 A1 | * | 11/2001 | Vieira-Soares | 296/98 |
| 2004/0238089 A1 | * | 12/2004 | Li et al. | 150/166 |

FOREIGN PATENT DOCUMENTS

| | | |
|---|---|---|
| DE | 19610751 | 4/1997 |
| DE | 10124574 | 11/2002 |

* cited by examiner

*Primary Examiner*—H Gutman
(74) *Attorney, Agent, or Firm*—Michael I. Kroll

(57) ABSTRACT

A vehicle covering device having a housing integral with an axle having a folding crank handle to utilize a reeling action useful in the withdrawing and retracting of a folding cover comprised of a sheet like material that when withdrawn can be expanded to cover a vehicles body by manipulation of an end rod attached to said folding covers end portion that is pulled through the jam of a trunk and over a vehicles forward body to effectively protect said vehicle. Additionally the device has base elements integral to its housing for providing support and if desired a secondary rear folding cover that may withdrawn in the same manner that may be utilized to cover the rear or trunk portion of a vehicle as well.

9 Claims, 20 Drawing Sheets

VEHICLE PROTECTING COVER DEVICE

BACKGROUND OF THE INVENTION

1. Field of the Invention

The present invention relates generally to vehicle covers and, more specifically, to a vehicle covering device having a housing integral with an axle having a folding crank handle to utilize a reeling action useful in the withdrawing and retracting of a folding cover comprised of a sheet like material that when withdrawn can be expanded to cover a vehicle's body by manipulation of an end rod attached to said folding cover end portion that is pulled through the jamb of a trunk and over a vehicle's forward body to effectively protect said vehicle and a rear folding cover that is used to cover the rear or trunk portion of a vehicle as well.

2. Description of the Prior Art

There are other vehicle covering devices designed for protecting a vehicle's exterior. Typical of these is U.S. Pat. No. 4,848,823 issued to Flohr, et al. on Jul. 18, 1989.

Another patent was issued to Fasiska on Jan. 5, 1993 as U.S. Pat. No. 5,176,421. Yet another U.S. Pat. No. 5,176,421 was issued to Heider, et al on Apr. 19, 1994 and still yet another was issued on May 14, 1996 to Thompson as U.S. Pat. No. 5,516,181.

Another patent was issued to Gibbs on Jan. 28, 1997 as U.S. Pat. No. 5,597,196. Yet another U.S. Pat. No. 5,597,197 was issued to Mowar, et al. on Jan. 28, 1997. Another was issued to Cheng, et al. on Oct. 17, 2000 as U.S. Pat. No. 6,131,643 and still yet another was issued on Feb. 4, 2003 to Li, et al. as U.S. Pat. No. 6,513,858.

Another patent was issued to Porter on Nov. 15, 2005 as U.S. Pat. No. 6,964,446. Yet another U.S. Pat. No. 6,981,509 was issued to Sharapov on Jan. 3, 2006. Another was issued to Koch on Apr. 24, 1997 as German Patent No. DE 19610751 and still yet another was issued on Nov. 28, 2002 to Hoffmann as German Patent No. DE10124574.

U.S. Pat. No. 4,848,823

Inventor: Arno K. Flohr, et al.

Issued: Jul. 18, 1989

A remotely controlled power-assisted vehicle cover is attached to a take-up spool winding and unwinding mechanism which is housed in an eccentric-shaped containment tube, mounted under the front or back bumper areas of a vehicle. The vehicle cover is extracted from the cylindrical cover containment tube and placed over a vehicle by a wand fastened to the leading edge of the vehicle cover and houses a wireless control system including a remote motor control and a transmitter to send: on/off, single or variable speed, and reversing controls to the drive motor of the cover extracting/retracting mechanism. In addition to controlling the cover drive motor, the control wand is used to physically guide the protective cover on or off the vehicle. The control wand can easily be operated with one hand and enables precise control of the power-assisted application or removal of the vehicle cover. The cover application operation is done so quickly that a blanket of air is trapped between the cover and the vehicle and helps the cover slide freely over the surface of the vehicle.

U.S. Pat. No. 5,176,421

Inventor: Edward J. Fasiska

Issued: Jan. 5, 1993

A cover system for an automobile includes a flexible cover, preferably of nylon, having leading, trailing and side edge portions and of a suitable dimension to fit over the entire car body from the rear bumper to the front bumper and sides thereof. The flexible cover includes an elastic leader segment attached at a first end to the cover and spaced from the trailing edge thereof. A second end of the leader segment is attached to a rotatable spool housed in a containment tube. The spool is rotated for storing in the cover by a motor, by a spring-biased shaft arrangement or by a manually turnable crank, or combinations thereof. The containment tube may be pivotally mounted by straps within the interior of the trunk for storage therein and is adapted to be pivotally swung outwardly from the trunk to an operable position at the rear of the trunk lid. After the cover is applied to the automobile, the containment tube is swung back to the trunk compartment for safe storage.

U.S. Pat. No. 5,303,972

Inventor: Merle J. Heider

Issued: Apr. 19, 1994

A top closure for a rectangular box includes a tarpaulin having one edge connected to one top edge of the box, and having the opposite edge wound around an elongated shaft. A reversible motor is connected to the shaft for winding and unwinding the tarpaulin to open and close the top closure. A remote transmitter is adapted to send either a wind or an unwind signal to a receiver which is connected through solenoids to the reversible motor. By pressing one button on the remote transmitter it is possible to rotate the motor in one direction, and by pressing the other button on the remote transmitter it is possible to rotate the motor in the opposite direction.

U.S. Pat. No. 5,516,181

Inventor: Craig D. Thompson

Issued: May 14, 1996

A roll-up covering for motor vehicles comprised of a rectangular main section 10 and side flaps 14 with antenna slits 18, 20 in either to accommodate antennas. A cylinder 16 is fixed perpendicular to the length of the main section and located between the main section and the top of the vehicle while in use. The side flaps 14 partially cover the side of the vehicle while in use and fold over the top of the main section for removal. Combined, the covering rolls around the cylinder for compact storage. Rear adjustable straps 26 anchor the covering in the rear compartment of the vehicle for theft prevention and as a means of changing the fit of the covering. Front elastic straps 11 and side elastic straps 12, in conjunction with the rear adjustable straps and the cylinder, tension the main section and side flaps to provide an airspace 34. The airspace between the covering material and the majority of the top vehicle surfaces provides for insulation and ventilation.

U.S. Pat. No. 5,597,196

Inventor: Edward R. Gibbs

Issued: Jan. 28, 1997

A system for the deploying and storing of an automobile cover. The system is provided with a roller assembly which can be made to be pivotally disposed about the axis of an axle. Attached to the roller at one end and the axle at another end is a spring means. The roller assembly has attached to it a full body automobile cover. The cover having one end adapted to covering and being secured to the end of the automobile opposite from the trunk, and the other end attached to the roller. The cover wound around the roller assembly and the roller assembly is stored in the trunk compartment of the automobile. The cover can be easily unwound from and wound back onto the roller with the assistance of the spring biased roller. The operator can quickly deploy the cover by pulling it from the back of the trunk over the trunk lid, and over the car, securing it to front bumper. The trunk can be closed after the cover is secured to the front bumper, thus securing the system inside the trunk.

U.S. Pat. No. 5,597,197

Inventor: Zeev Mowar, et al.

Issued: Jan. 28, 1997

An automobile sunshade cover shades a passenger compartment of an automobile. The sunshade is attached at one end to a pouch for storing the cover, and is arranged so that the pouch is freely suspended by laces from suitable fittings of the automobile, such as the hinges attaching the lid of the trunk to the automobile body. The pouch serves to anchor the sunshade when deployed. The sunshade has a crossbar attached to its front edge which provides a convenient grip for the user during the deployment and folding back of the cover, while acting as a second anchor of the cover when placed under the windshield wipers. In its operative position, the sunshade covers all the automobile's windows providing protection against the sun regardless of the time of day that the sunshade is deployed or the orientation of the parked vehicle. The sunshade does not cover the automobile's registration plates or rear reflectors. It is conveniently and unobtrusively stored away in the trunk when not in use to overcome the disadvantages of regular sunblinds, which typically obstruct a driver's field of view or clutter up an automobile's interior.

U.S. Pat. No. 6,131,643

Inventor: Carson Jun Ping Cheng, et al.

Issued: Oct. 17, 2000

A sun shield device for automobile includes a tubular central axle, a revolving sleeve which has a diameter larger than and a length shorter than that of the central axle being rotatably supported around the central axle, a shading sheet engaged on and wound around the revolving sleeve, an auto-rewinding device which is installed between the central axle and the revolving sleeve for driving the revolving sleeve to rotate so as to automatically rewind the shading sheet around the revolving sleeve, a supporting device including a pair of supporters extendably connected to two ends of the central axle respectively, and an adjusting device for adjusting the length of at least one of the supporters so as to adjust an overall length of the sun shield device until two supporting end members of the two supporters respectively firmly pressed against two interior side walls of a trunk of an automobile so as to horizontally support the sun shield device within the trunk. Whereby, the user may simply open the trunk cover and pull the shading sheet from the revolving sleeve out of the trunk through the gap formed between the opened trunk cover and trunk edge for at least covering the roof of the automobile.

U.S. Pat. No. 6,513,858

Inventor: Xingkang Li, et al.

Issued: Feb. 4, 2003

A spring tensioned roller and spaced tension bar have a vehicle cover folded in half and rolled around the spring tensioned roller. The rear half of the cover has an end rod and a central opening which allows it to be hooked over a trunk lock mechanism and kept secure when the trunk is shut. The front half of the cover has a lead rope or belt with two hooks for securing it under the hood of the vehicle or any other edged surface on the front of the car. The tensioned cover is elevated above the roof of the vehicle by the roller and tension bar for purposes of ventilation.

U.S. Pat. No. 6,964,446

Inventor: Matthew B. Porter

Issued: Nov. 15, 2005

A retractable vehicle cover apparatus for covering a vehicle comprises an elongated, hollow housing, and axle disposed therein for rotation about a central axis, and an elongated cover having a proximal end coupled with the axle and also having a distal end. The housing includes wall structure having an elongated aperture defined through the wall structure. The cover is fed through the aperture for selective movement between a retracted position where the cover is wrapped around the axle, and an extended position where a substantial portion of the cover extends from the housing. The cover includes an outer layer of aligned cover strips, a middle, elastic layer and an inner layer of aligned padding strips. The elastic layer biases the cover toward a rest width substantially the same length as the aperture to facilitate extension and retraction of the cover, and permits selective expansion of the cover in order to more fully cover the vehicle.

U.S. Pat. No. 6,981,509

Inventor: Sergey Sharapov

Issued: Jan. 3, 2006

A protective cover for a vehicle comprising a sheet or a web of a flexible material that possesses a property of buckling or curving in the upward direction from the vehicle with the formation of a canopy-type shield for protecting the vehicle from direct sun rays, birds' droppings, etc. The sheet has a length exceeding the length of the upper surface periphery of the vehicle so that the upwardly curved canopy is formed either by applying two oppositely directed forces to the opposite ends of the sheet or by prestressing the sheet. The sheet can be made from plastic or a fabric that incorporates springing metal strips that tend to curve upward when they are in a free state. The sheet can be conveniently stored in wound state in a cylindrical cassette. Storage of the flexible material in a wound state enhances the property of bucking or curving when the sheet is withdrawn from the cassette.

German Patent Number DE 19610751

Inventor: Michael Koch

Issued: Apr. 24, 1997

The cover has lateral roof frame parts (2) which extend along a support arc contour over the complete length of the closed cover and consist of several frame components arranged one after the other, the face ends of which work in conjunction with one another. In the rear area of the vehicle a drum is arranged, with which the cover can be wound up in a non-usage position. The frame components on each of the two roof sides are articulately connected to one another by a flexible belt (12) or wire rope (14), the rear ends of which are held by the drum. The belt or rope runs along the upper side of their frame components on the corresponding roof side.

Inventor: Helmut Hoffmann

Issued: Nov. 28, 2002

A protective cover for a parked vehicle provides protection from either cold conditions or sunshine. A flexible sheet is stretched over the vehicle and is secured at each end to the vehicle. Spacers hold the sheet away from the vehicle for optimum protection. An alternate design has rigid panels positioned over the vehicle on spacers. The panels can be sheet material or frame over which flexible material is stretched.

While these vehicle covering devices may be suitable for the purposes for which they were designed, they would not be as suitable for the purposes of the present invention, as hereinafter described.

SUMMARY OF THE PRESENT INVENTION

A primary object of the present invention is to provide a vehicle covering device having a folding cover that is easily withdrawn and dispersed over a vehicle and easily retracted by a reeling mechanism Another object of the present invention is to provide vehicle covering device having a folding crank handle for retracting a withdrawn folding cover utilizing a reeling action.

Yet another object of the present invention is to provide vehicle covering device having base elements to provide stability.

Still yet another object of the present invention is to provide vehicle covering device having a second rear folding cover that may be used in addition to the folding cover to cover the rear portion of the present invention.

Another object of the present invention is to provide vehicle covering device having an end bar for easy withdrawing and dispersing of the folding covers from the housing Yet another object of the present invention is to provide vehicle covering device that may be stored in a vehicles trunk and utilized by withdrawing the folding cover through the trunks jam.

Still yet another object of the present invention is to provide vehicle covering device having a housing that contains a rotating axle for the winding and compact storage of a folding cover therein Additional objects of the present invention will appear as the description proceeds.

The present invention overcomes the shortcomings of the prior art by providing vehicle covering device having a housing with integral base elements having a reeling means with a folding crank handle and an end bar to help in the manipulation and distribution of a folding cover through a trunks jam and over a vehicle. Additionally the present invention may include a second folding cover utilized in the same manner for covering the rear portion of a vehicle as well.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
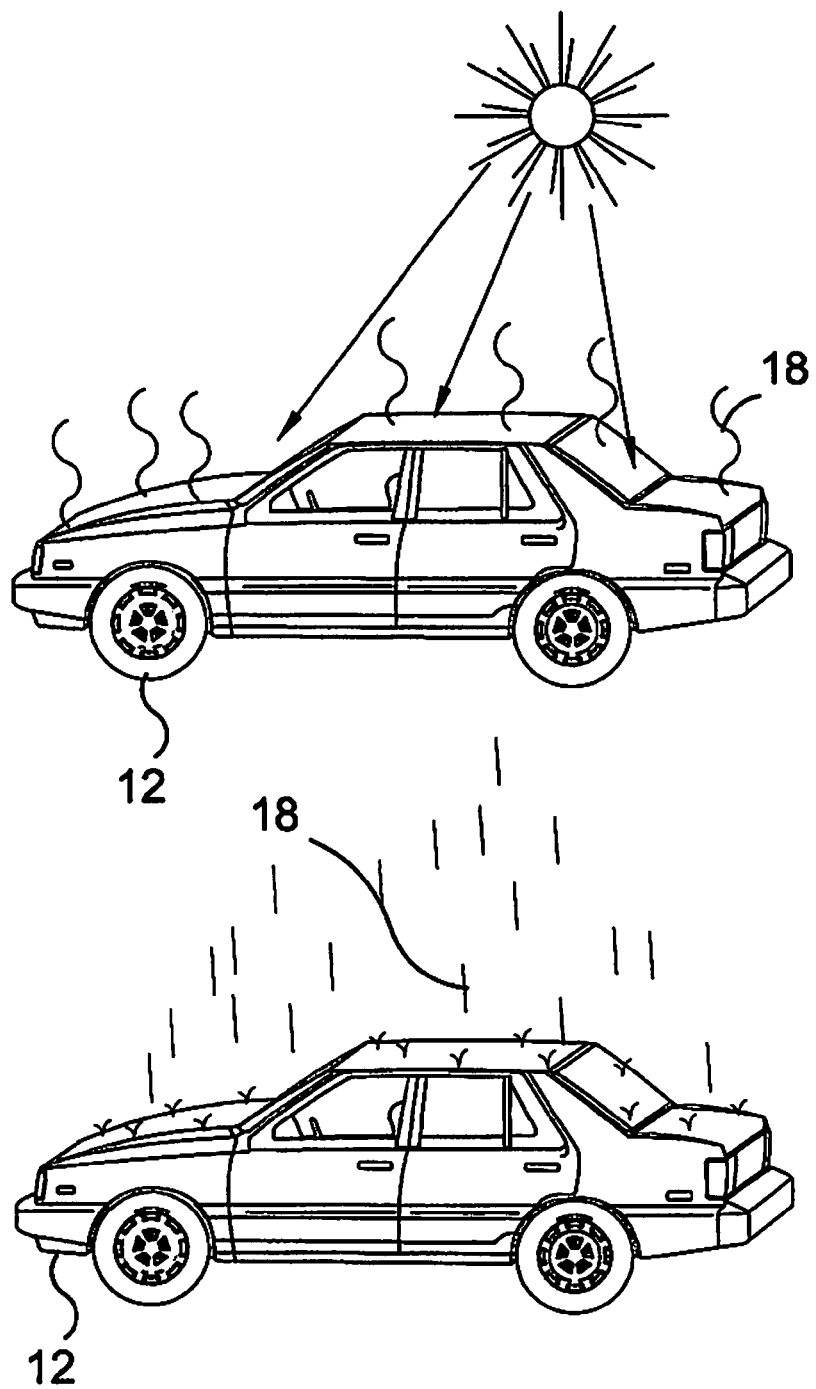
FIG. 1 is a side view of prior art.

Turning now descriptively to the drawings, in which similar reference characters denote similar elements throughout the several views, the Figures illustrate the dashboard display system of the present invention. With regard to the reference numerals used, the following numbering is used throughout the various drawing Figures.

10 car cover of the present invention
11 user
12 vehicle
14 vehicle trunk
16 trunk jamb
18 climate
20 housing
22 axle
24 axle bearing
26 crank handle housing
28 crank
30 crank hinge
32 crank handle
34 housing slot
36 cover
38 front cover
40 front cover fastener
42 front cover window
44 rear cover
46 rear cover fastener
48 rear cover window
50 cover weights
52 rod
54 rod caps
56 pliable cord
58 stand
60 magnet
62 stand-leg cover
64 remote
66 motor

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of prior art. Motor vehicles 12 are exposed to climate 18 which accelerates the deterioration of the finish. The present invention provides an apparatus and method for protecting the vehicle form sun, rain and snow.

Figure 2:
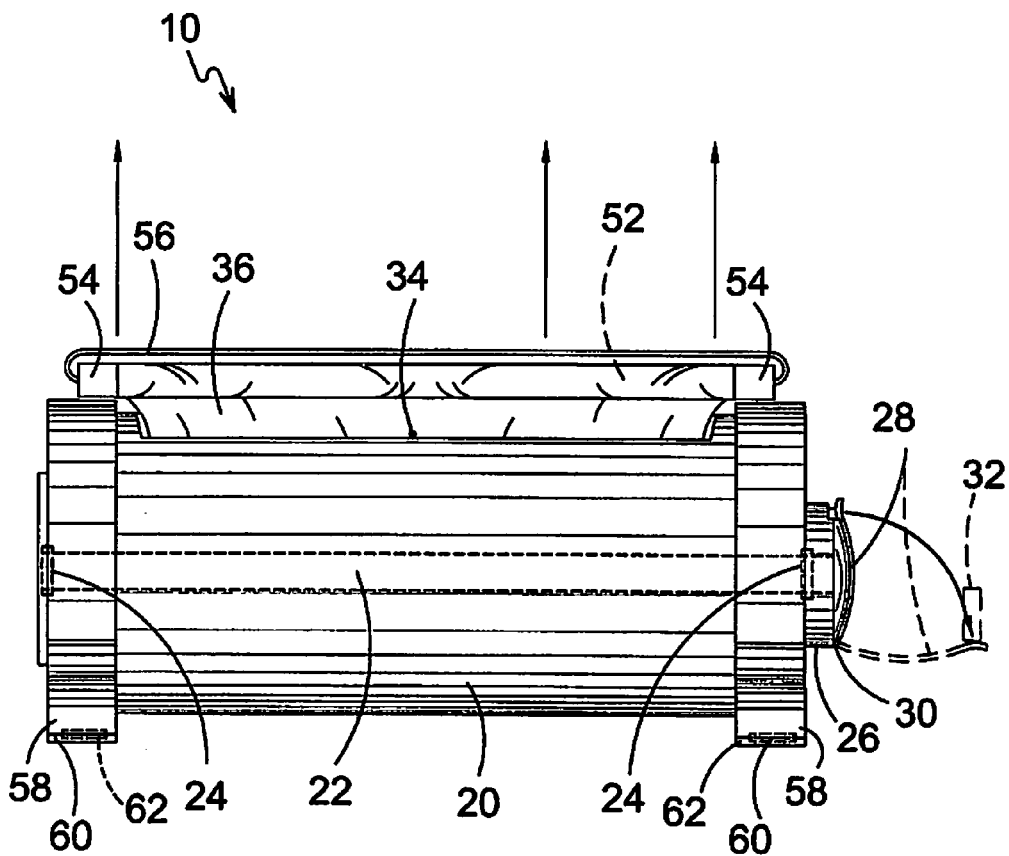
FIG. 2 is a side view of the present invention in use.

FIG. 2 is a front view of the present invention. Shown is the apparatus of the present invention comprising car cover housing 20 having an interiorly positioned axle 22 that may include axle bearing 24. On one end of housing 20 is crank handle housing 26 engaging axle 22 with crank 28 hingedly attached thereto. When crank 28 is pivoted via crank hinge 30, crank handle 32 is used to rotate axle 22. Within the housing body is slot 24 substantially parallel with axle 22. Cover 36 is spooled onto axle 22 and is extended and retracted through housing slot 34. To prevent the free end of cover 36 from being wound into housing 20, rod 52 has a length greater than slot 34. In addition, rod 52 adds rigidity to the free end of cover 36 and provides pliable cord 56 to aid in handling cover 36. Rod 52 may also include rod caps 54. Car cover housing 20 has stand legs 58 that may incorporate magnets 60 so that the apparatus can be attached to the interior trunk lid and provides stand-leg cover 62 to prevent marring of the vehicle finish.

Figure 3:
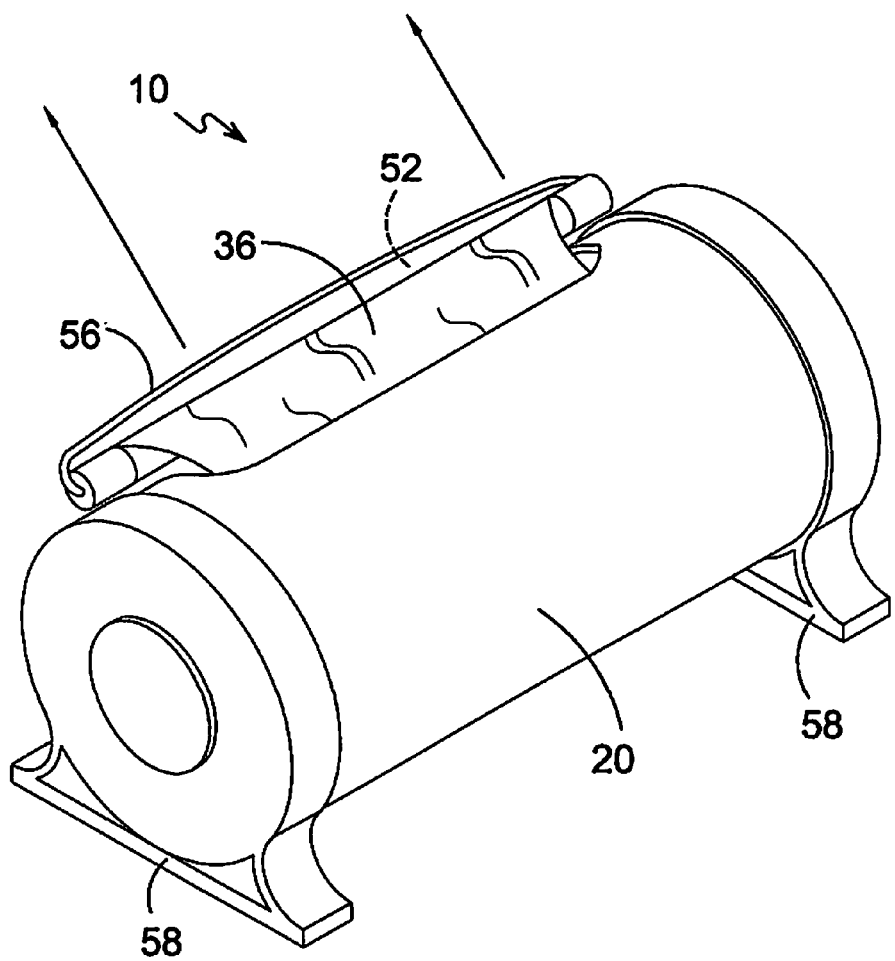
FIG. 3 is a perspective view of the present invention in use.

FIG. 3 is a rear view of the present invention. The car cover apparatus 10 comprises stand 58 and housing 20 having a spooled car 36 attached to rod 52 on its free end that provides pliable cord 56 to aid in the handling of the cover.

Figure 4:
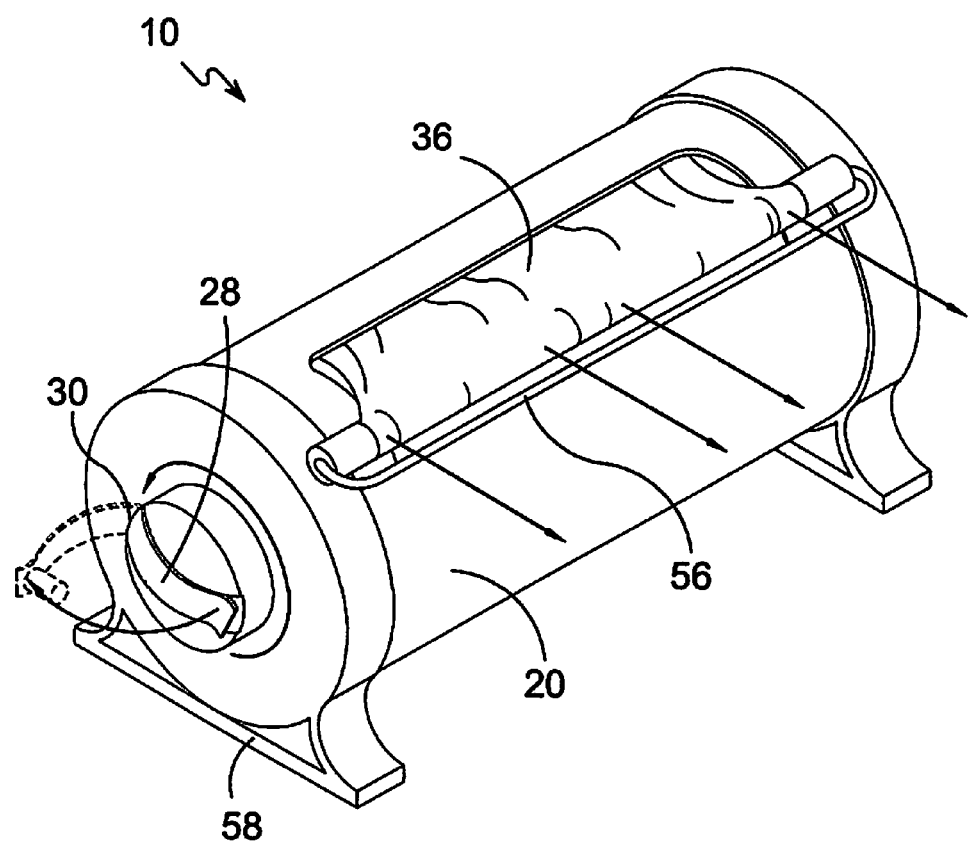
FIG. 4 is a perspective view of the present invention attached to a trunk by magnets.

FIG. 4 is a front view of the present invention, attached to a trunk by magnets. Shown is the deployable car cover apparatus of the present invention comprising car cover housing 20 having crank 28 hingedly attached by crank hinge 30. When cover 36 is deployed by withdrawing cover 36 using pliable cord 56, it can be easily rewound using crank 28.

Figure 5:
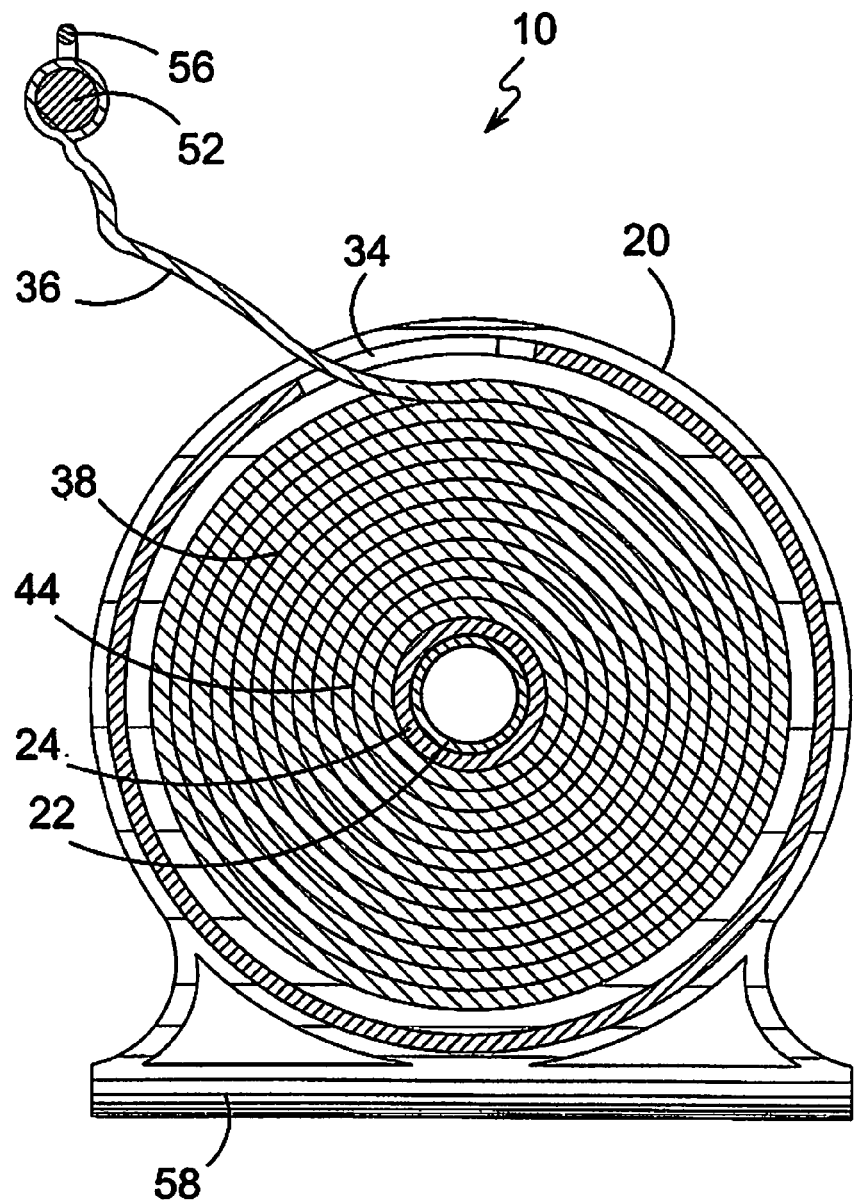
FIG. 5 is a sectional view of the present invention attached to a trunk by magnets.

FIG. 5 is a sectional view of the present invention. Shown is the car cover 36 spooled on axle 22 within housing 20 supported by stand 58. Housing 20 has housing slot 34 through which the cover is deployed and retracted. Cover 36 comprises front cover 38 and rear cover 44 with the leading edge of front cover 38 attached to rod 52 which has pliable cord 56 fixed to its distal ends to aid in deployment. Also shown is axle bearing 24.

Figure 6:
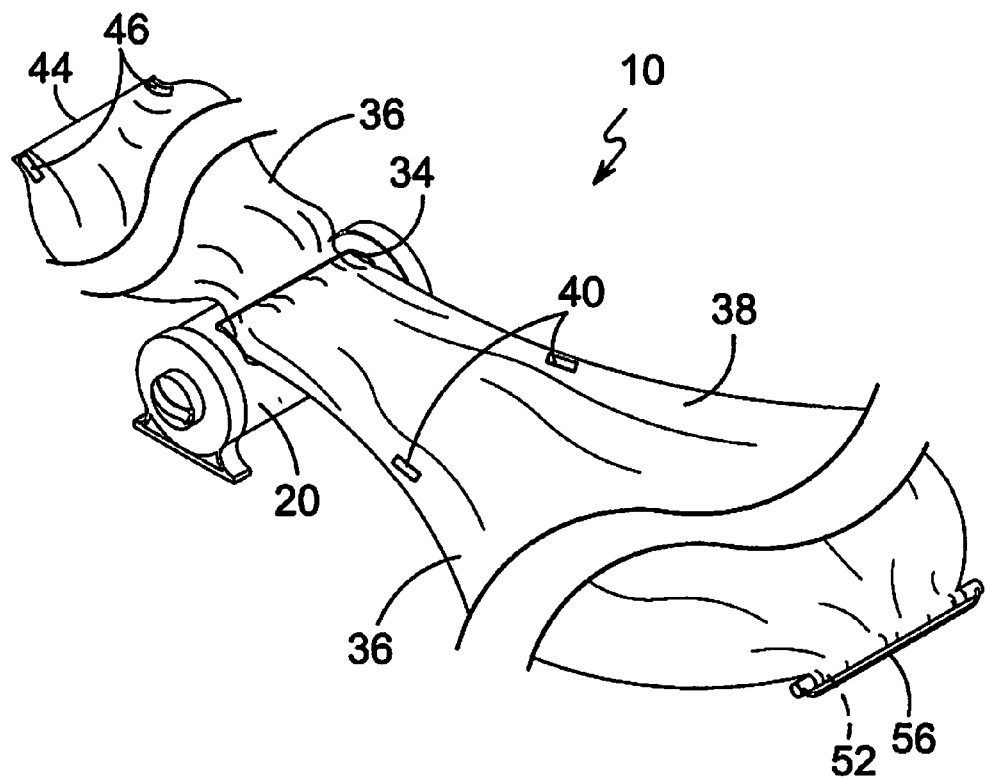
FIG. 6 is a perspective view of the present invention.

FIG. 6 is an illustrative view of the deployed car cover. Shown is car cover 36 deployed from housing 20 through housing slot 34 comprising front cover 38 and rear cover 44 having mating fasteners 40, 46 respectively. Front cover 38 is attached to rod 52 having pliable cord 56 to aid in deployment. The front and rear covers are of differing lengths with the larger extending from the trunk to the front of the car and the smaller extending from the trunk over the rear of the car. When the front cover 38 is deployed, the rear cover 44 attached at the appropriate length to the front cover by mating fasteners 40, 46 is unfastened and draped over the rear of the vehicle.

Figure 7:
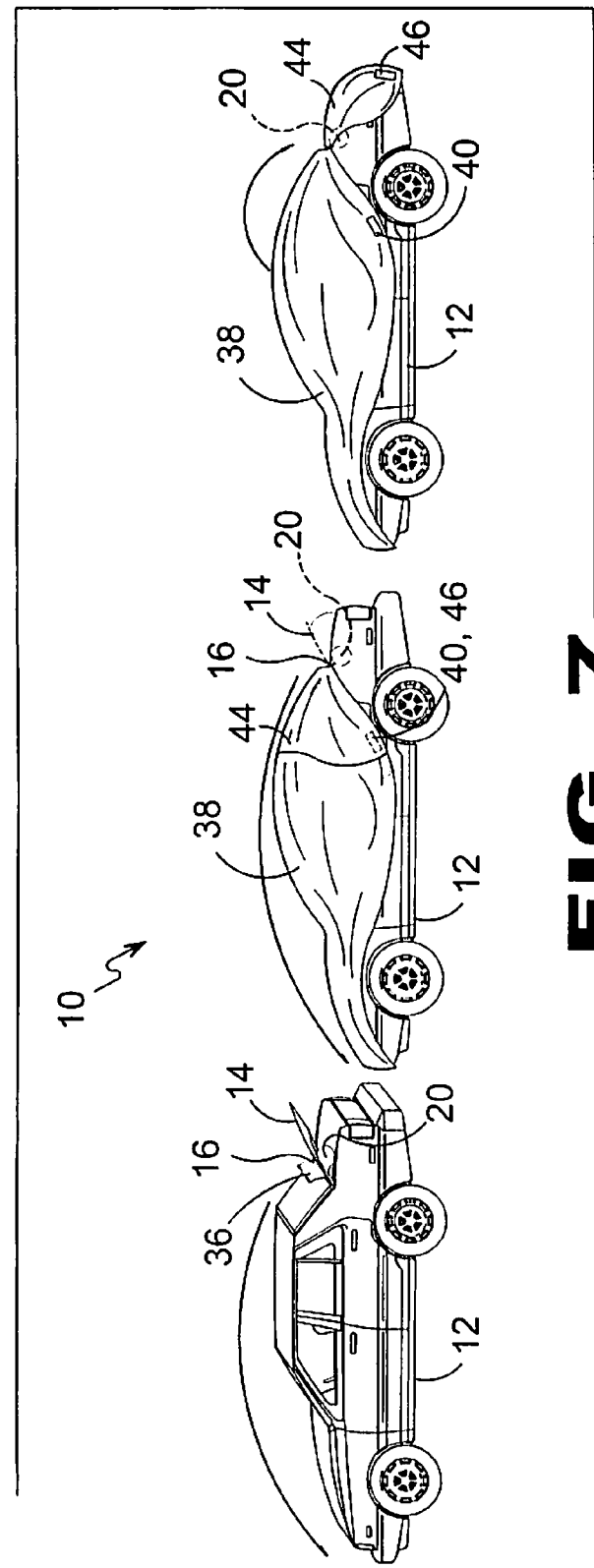
FIG. 7 is a back perspective view of the present invention.

FIG. 7 is an illustrative view of the present invention in use. The present invention provides a spooled car cover 36 that is securely stored within the vehicle 12 trunk and when deployed can only be removed by opening the vehicle trunk since the cover is securely bound within the trunk jamb. To use the cover 36, the trunk 14 is opened and the free end is feed through the trunk jamb 16 across the top of the vehicle to its desired destination. The car cover is easily deployed from within the housing by virtue of a freewheeling axle. Once the cover 36 is extended to its open state, the trunk is closed binding the cover within the jamb 16. The shorter rear cover 44 is releasably attached at its free end to the longer front cover 38 by fasteners 40, 46, such as VELCRO (which is a hook and loop fastener), that when detached allows the rear cover 44 to be draped over the rear of the vehicle. The process for storing the cover 36 is essentially reversing the deployment process. The shorter rear cover 44 is laid over the front cover 38 placing the fasteners 40, 46 into engagement where then the trunk is opened and the cover 36 is rewound into the cover housing 20 using the provided crank. The present invention provides that the car cover housing can be free standing within the trunk or magnetically attached to the underside of the trunk.

Figure 8:
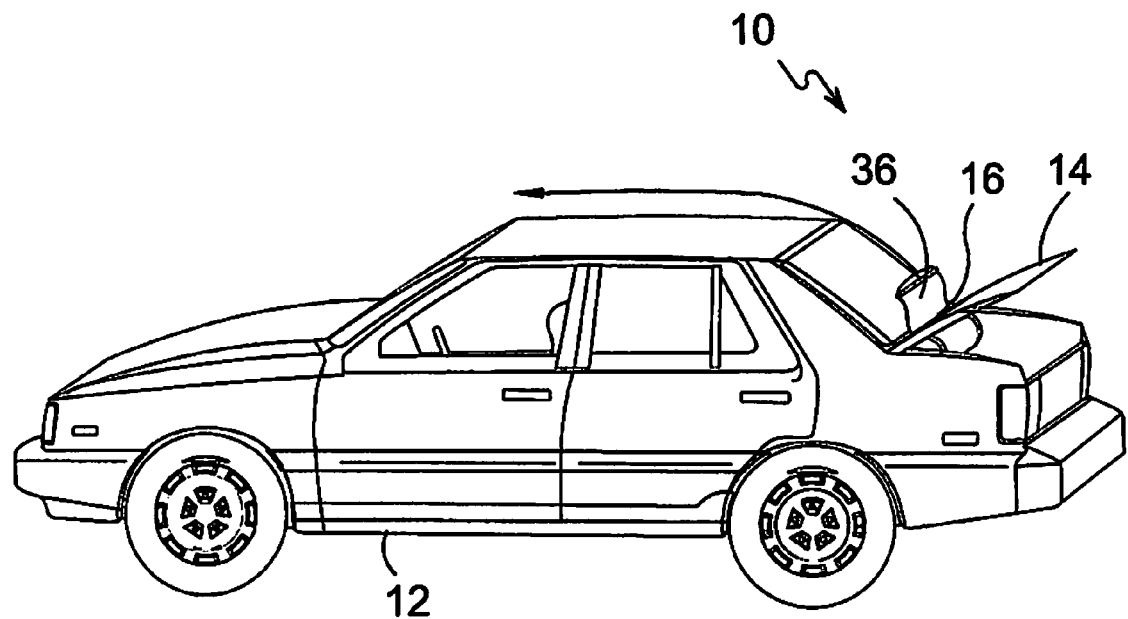
FIG. 8 is a side view of the present invention.

FIG. 8 is a side view of the present invention in use. Illustrated is vehicle 12 having the car cover housing 20 magnetically fastened to the interior side of trunk 14 with the cover 36 free end fed through trunk jamb 16 where it can then be extended across the top of the vehicle.

Figure 9:
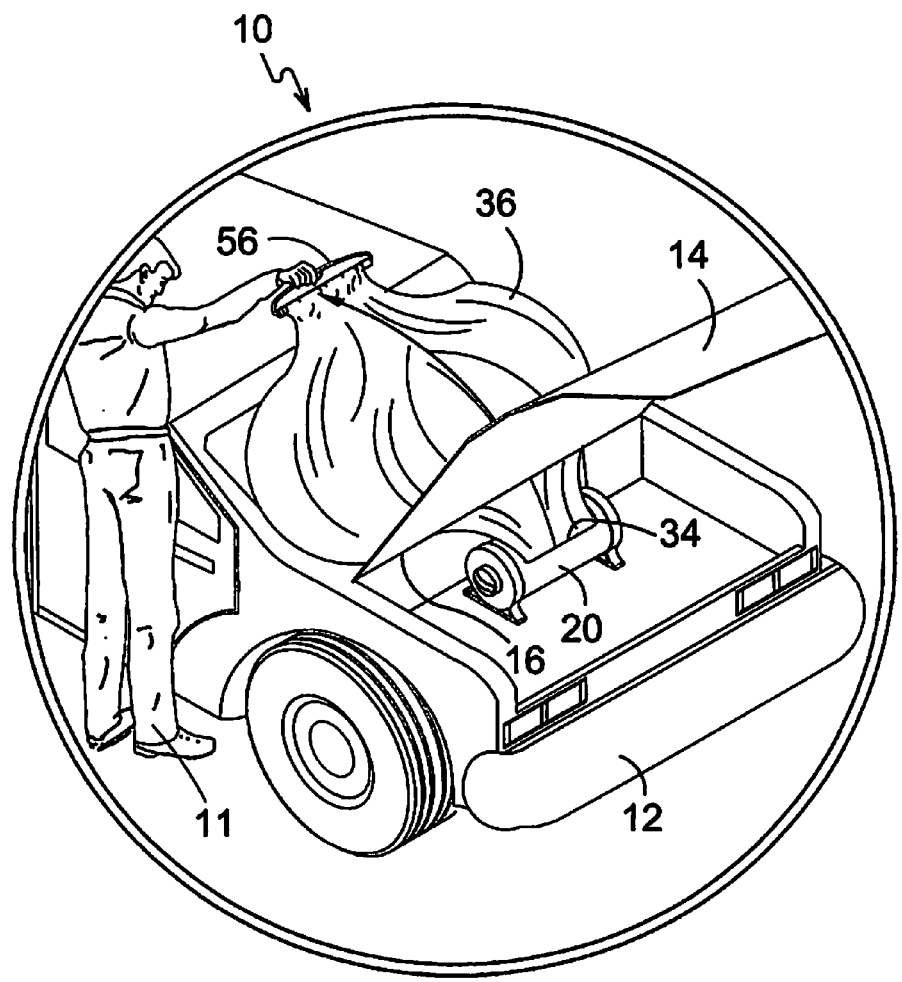
FIG. 9 is a side view of the present invention in use.

FIG. 9 is a perspective view of the present invention in use. The present invention 10 provides a spooled car cover 36 within housing 20 that can be positioned in a free standing state within trunk 14. To deploy the cover, user 11 simply opens the trunk grasps the car cover free end using pliable cord 56 and inserts it through trunk jamb 16 before extending it across the top of vehicle 12. The car cover is easily deployed through slot 34 within the housing by virtue of a freewheeling axle.

Figure 10:
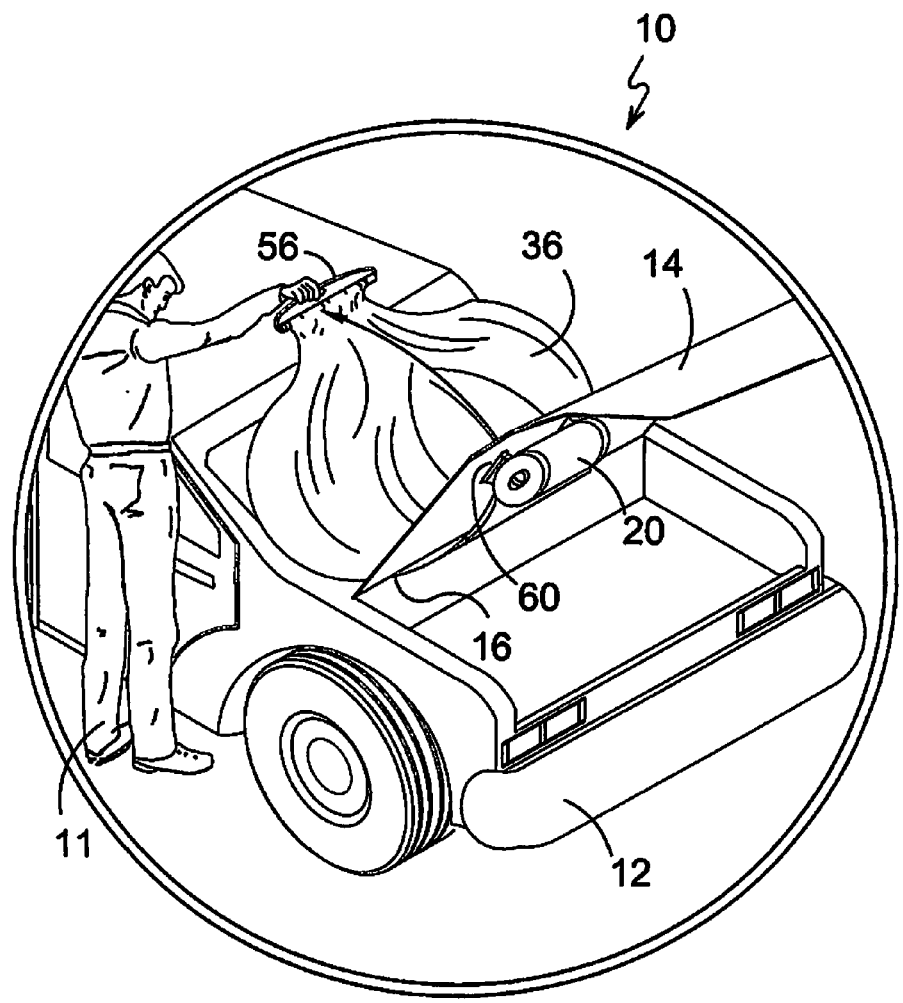
FIG. 10 is a side view of the present invention in use.

FIG. 10 is a perspective view of the present invention in use. The present invention 10 provides a spooled car cover 36 within housing 20 having magnetic elements 60 so that the housing can be attached to the interior side of the trunk lid 14. To deploy the cover, user 11 simply opens the trunk grasps the car cover free end using pliable cord 56 and inserts it through trunk jamb 16 before extending it across the top of vehicle 12.

Figure 11:
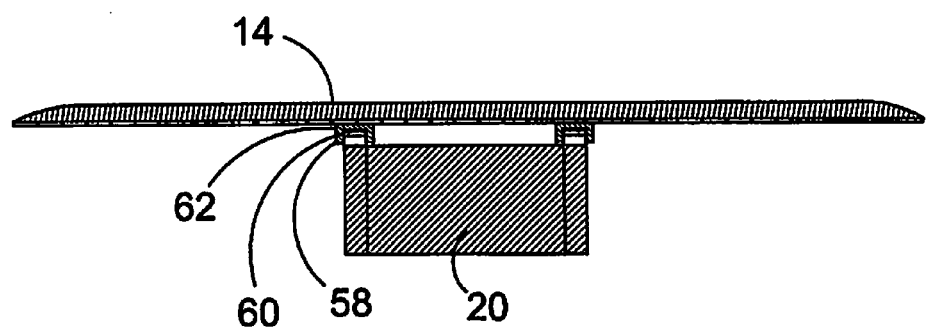
FIG. 11 is a side view of the present invention in use.

FIG. 11 is an illustrative view of the cover housing attached to the trunk. Shown is car cover housing 20 having stand 58 with magnetic elements 60 and protective caps 62 so that the housing can be magnetically attached to the underside of trunk lid 14.

Figure 12:
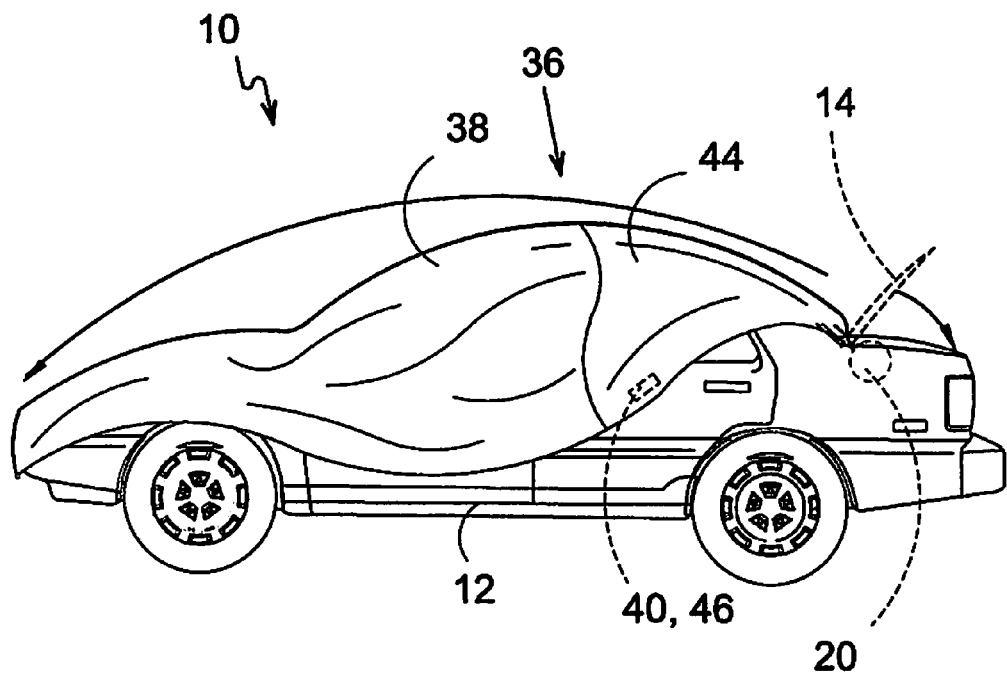
FIG. 12 is a perspective view of the present invention having a rear cover.

FIG. 12 is a side view of the car cover partially deployed. The present invention provides a spooled car cover 36 that is securely stored within the vehicle 12 trunk and when deployed can only be removed by opening the vehicle trunk since the cover is securely bound within the trunk jamb. To use the cover 36, the trunk 14 is opened and the free end is feed through the trunk jamb 16 across the top of the vehicle to its desired destination. The car cover is easily deployed from within the housing by virtue of a freewheeling axle. Once the cover 36 is extended to its open state, the trunk is closed binding the cover within the jamb 16. The shorter rear cover 44 is releasably attached at its free end to the longer front cover 38 by fasteners 40, 46, such as VELCRO, that when detached allows the rear cover 44 to be draped over the rear of the vehicle.

The covers are not of equal length therefore the shorter cover is attached on its free end to the longer front cover. In deployment the front cover is extended until correctly positioned then the free end (secured to the front cover by fasteners 40, 46) of the shorter cover, which is now accessible can be detached and extended over the rear once the trunk is closed. In retracting, the rear cover is folded back over the front cover until the hook and loop tabs mate. Then the trunk is opened and the cover is wound into the housing. Interestingly, this solves another problem with the process of deploying two covers from the trunk, what do you do with the rear cover while it is being deployed since the trunk is open? You would still have to deploy both covers in one direction, close the trunk and then drape the rear cover over the trunk. The shorter rear cover is releasably attached to the longer cover to prevent fouling during extending and retracting from the housing. This also simplifies its use since your only deploying and retracting the cover into the housing in one direction.

Figure 13:
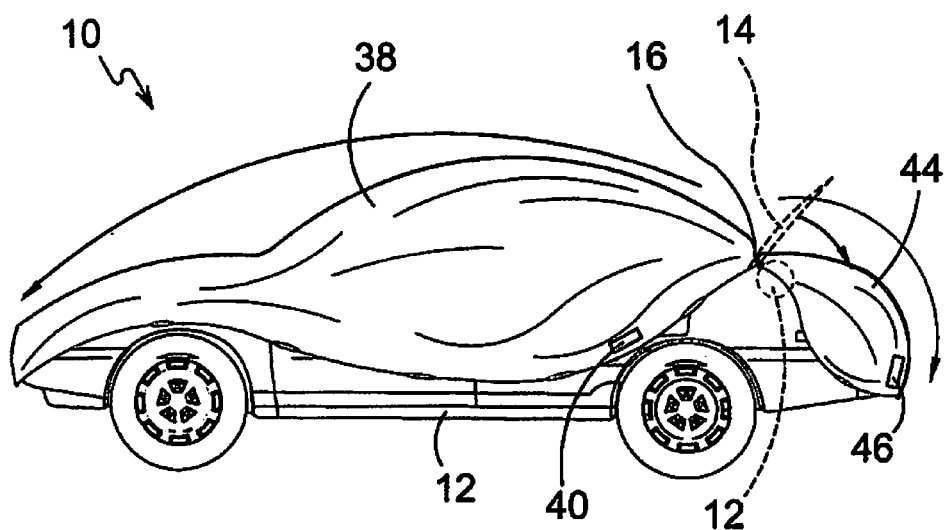
FIG. 13 is a perspective view of the present invention in use.

FIG. 13 is a perspective view of the car cover filly deployed. The shorter rear cover 44 is releasably attached at its free end to the longer front cover 38 by mating fasteners 40, 46, such as VELCRO, so that when detached rear cover 44 can be draped over the rear of the vehicle 12. The process for storing the cover 36 is essentially reversing the deployment process. The shorter rear cover 44 is laid over the front cover 38 placing the fasteners 40, 46 into engagement where then the trunk is opened and the cover 36 is rewound into the cover housing 20 using the provided crank.

Figure 14:
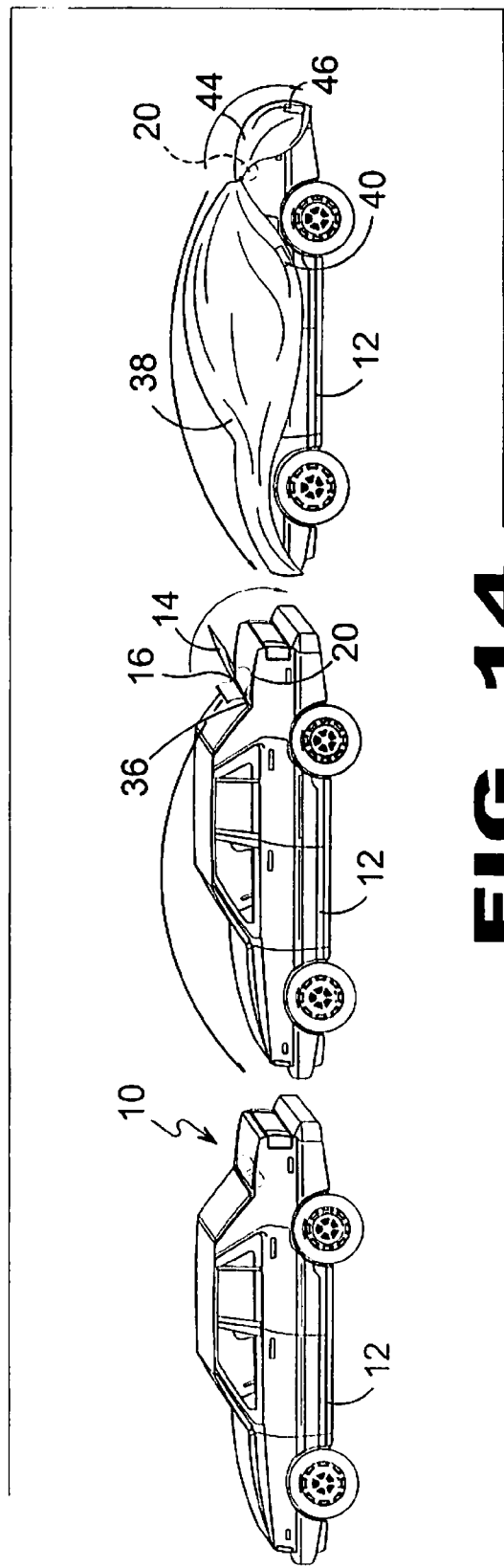
FIG. 14 is a side view of the present invention having a rear cover in use.

FIG. 14 is a side view of the present invention in use. The present invention 10 provides a spooled car cover 36 that is securely stored within the vehicle 12 truck and when deployed can only be removed by opening the vehicle trunk since the cover is securely bound within the trunk jamb. To use the cover 36, the trunk 14 is opened and the free end is feed through the trunk jamb 16 across the top of the vehicle to its desired destination. Once the cover 36 is extended to its open state, the trunk is closed binding the cover within the jamb 16. The shorter rear cover 44 is then draped over the rear of the vehicle.

Figure 15:
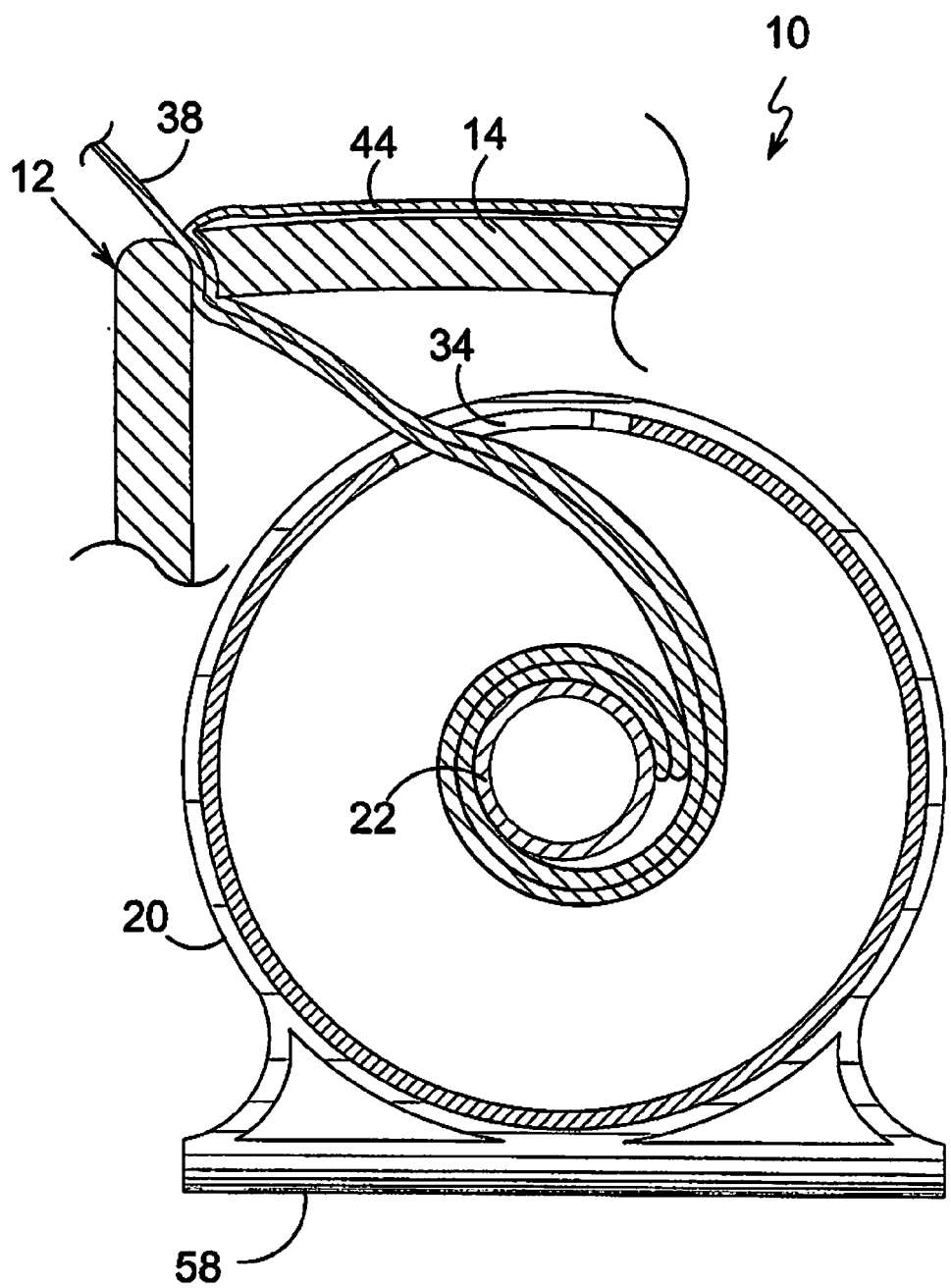
FIG. 15 is a side sectional view of the present invention.

FIG. 15 is a sectional view of the present invention bound within the trunk jamb. Shown is the present invention 10 having the car cover comprising front cover 38 and rear cover 44 bound when the trunk lid 14 of vehicle 12 is closed.

Figure 16:
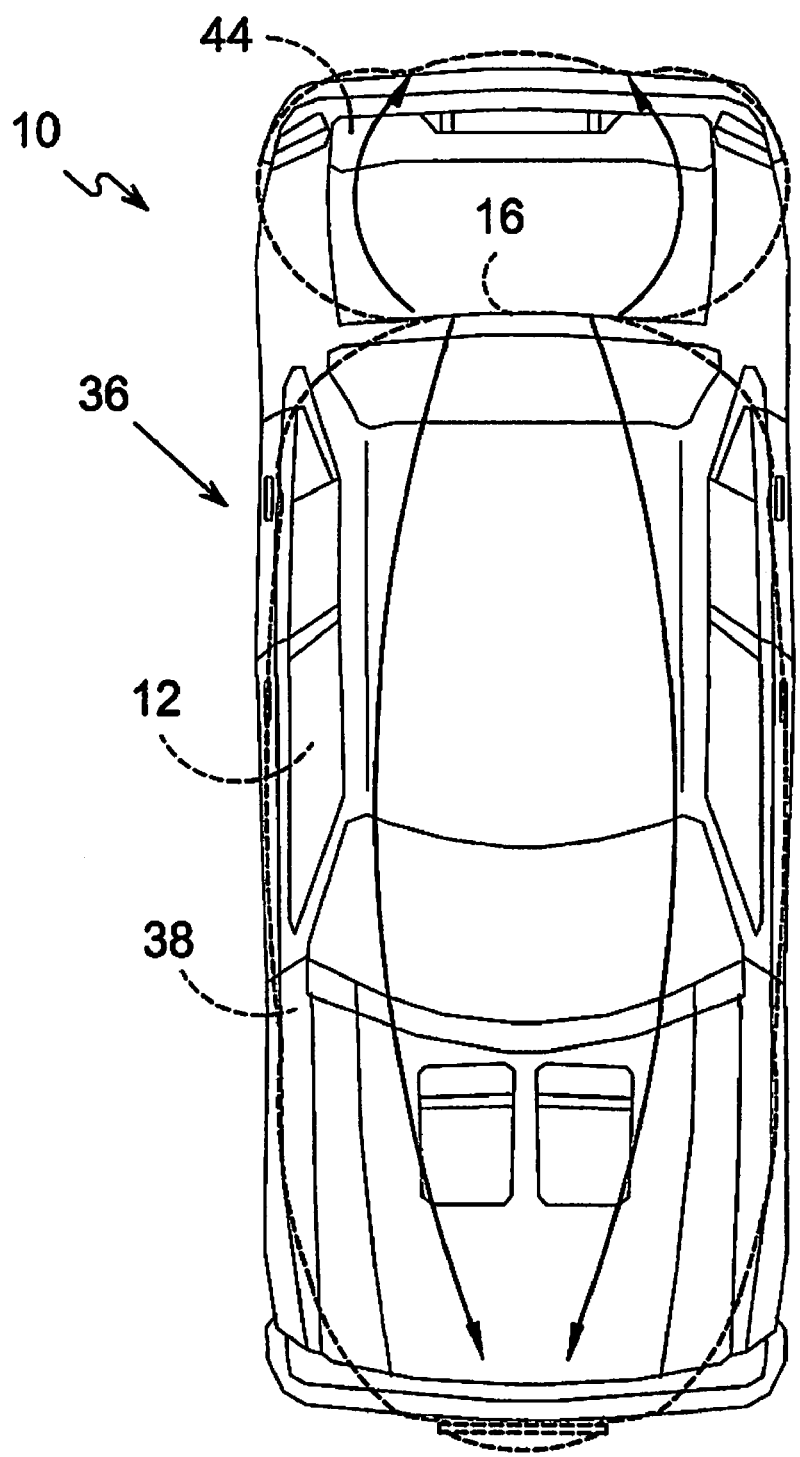
FIG. 16 is a top view of the present invention in use.

FIG. 16 is a top view of the present invention in use. Shown is the car cover of the present invention 10 encompassing vehicle 12. The car cover 36 comprises front cover 38 and rear cover 44 which extend from the trunk jamb 16 in their respective directions.

Figure 17:
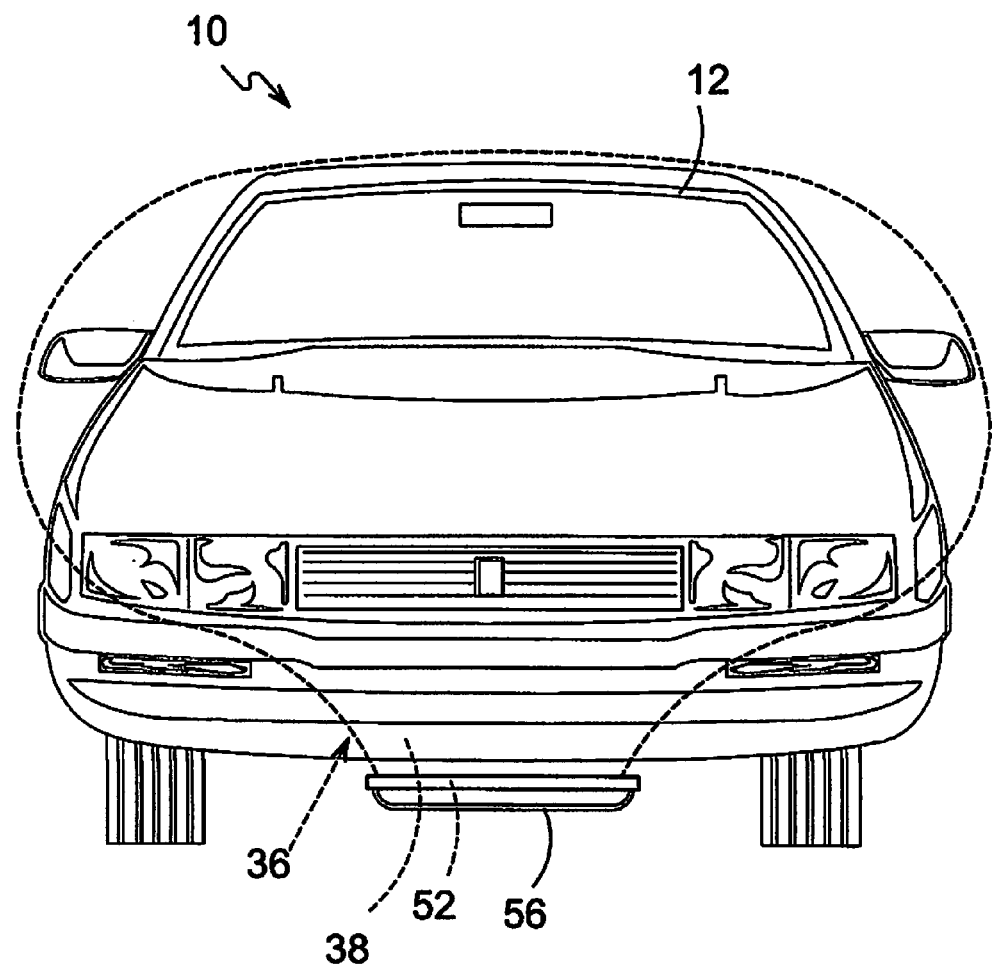
FIG. 17 is a front view of the present invention in use.

FIG. 17 is a front view of the present invention in use. Shown is car cover 36 having front cover 38 encompassing the front of vehicle 12. Also shown is rod 52 providing rigidity to the free end and pliable cord 56 provided for ease of use in handling the car cover.

Figure 18:
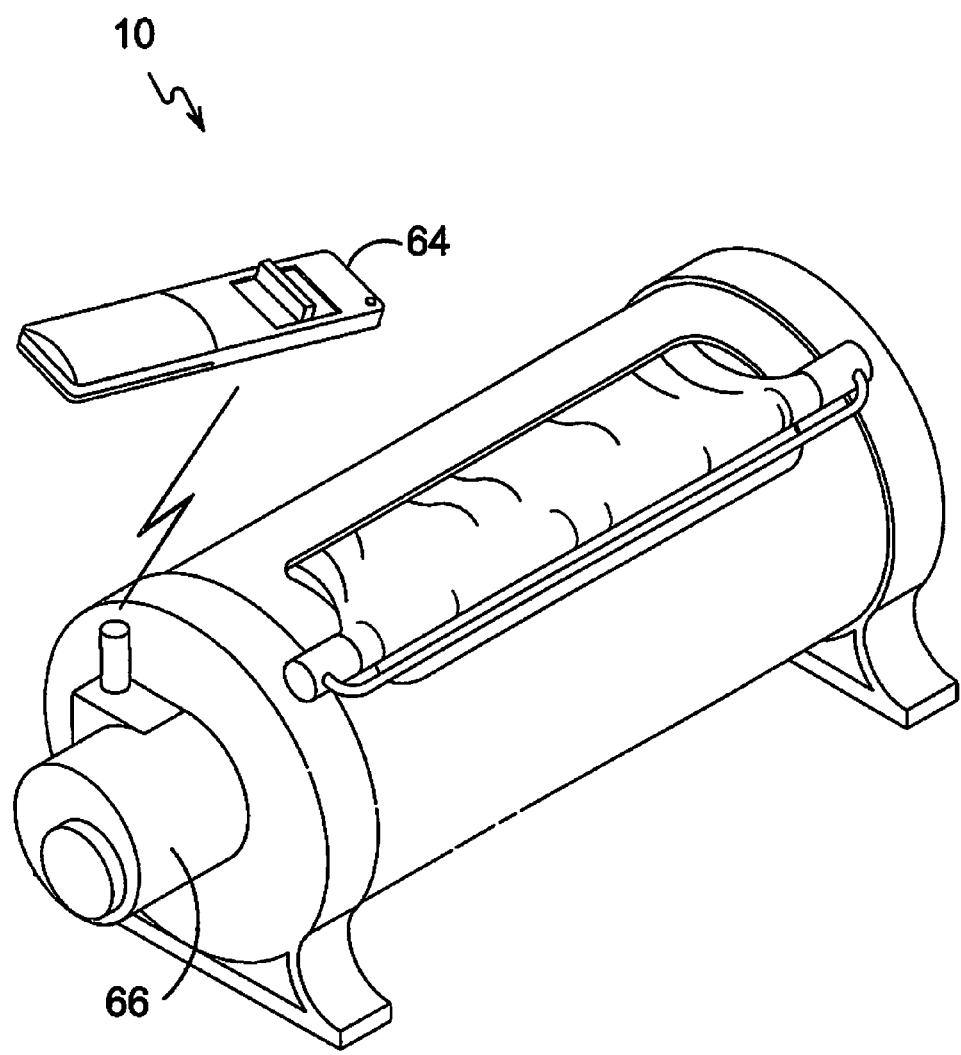
FIG. 18 is a perspective view of an additional element of the present invention.

FIG. 18 is a perspective view of an additional element of the present invention. Shown is the present invention 10 providing a remote control 64 and motor 66 whereby the cover of the present invention can be extended and retracted using said motor in conjunction with said remote.

Figure 19:
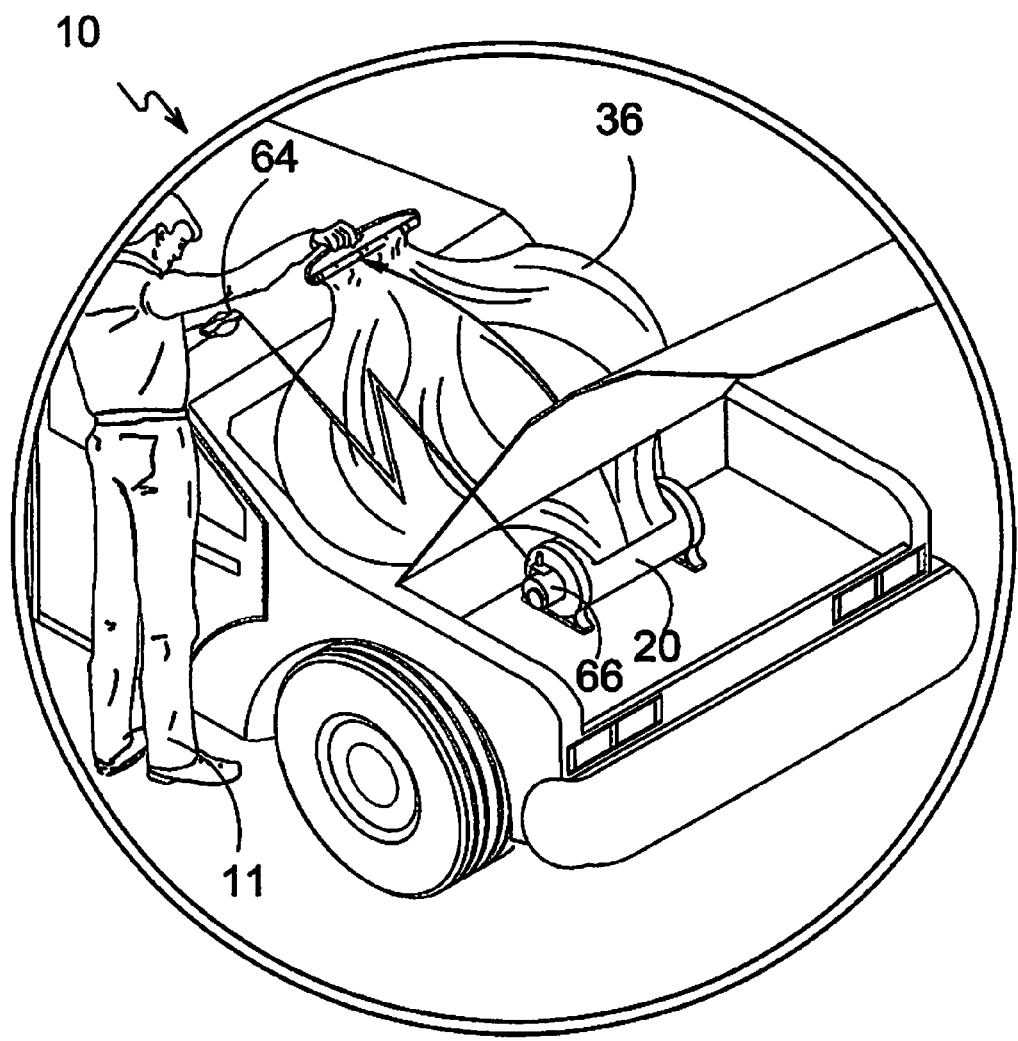
FIG. 19 is a perspective view of an additional element of the present invention in use.

FIG. 19 is a perspective view of an additional element of the present invention in use. The present invention 10 provides a spooled car cover 36 within housing 20 that can be deployed using motor 66 and remote control 64. To deploy the cover, user 11 simply opens the trunk grasps the car cover free end using pliable cord 56 and presses the remote to feed out enough of the cover to insert through the trunk jamb 16 before again depressing the remote to completely extended it across the top of vehicle 12.

Figure 20:
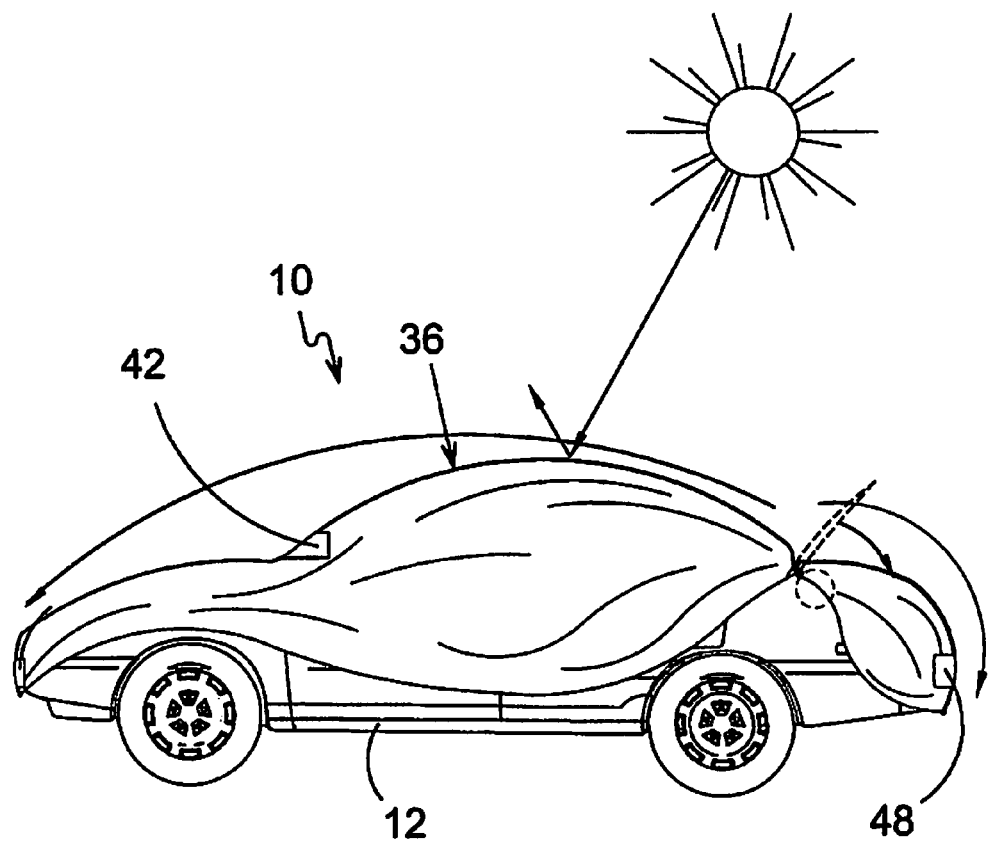
FIG. 20 is a side view of the present invention having a rear cover in use.

FIG. 20 is another additional element of the present invention. The present invention 10 further provides for additional elements wherein car cover 36 is manufactured from a heat reflective material. Also provided for are transparencies whereby the front cover has a window 42 positioned so that the vehicle's 12 inspection and registration are viewable during use of the cover. The rear cover also has a transparency 48 whereby the license plate is viewable when the cover is in use.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method for protecting a motor vehicle with a car cover that is selectively stored within a trunk of the vehicle wherein said method comprises:
   a) providing a car cover within the trunk of the vehicle until deployment is desired where the vehicle has a trunk lid and a body;
   b) opening the trunk to deploy the car cover;
   c) grasping a free end of the car cover by a rod-cord;

d) feeding the rod-cord and attached car cover through an opening between the trunk lid and the vehicle body;
e) extending the car cover toward the front of the vehicle until deployed into an open state;
f) closing the trunk;
g) releasing a trunk cover from a fastened state with a front cover;
h) extending the trunk cover toward the rear of the vehicle until deployed into an open state;
i) providing a housing for storing the car cover while not in use;
j) providing an axle rotatably positioned within said housing;
k) providing an exteriorly positioned foldable crank for rotating said axle;
l) having the car cover rotatably mounted on said axle;
m) the rod-cord including a rod with the free end of the car cover fixed thereto where the rod has distal ends;
n) the rod-cord further including a pliable cord fixed to distal ends of the rod serving as a handhold for manipulating the car cover; and
o) the housing including a pair of stand-legs positioned on opposing ends of said housing serving to stabilize the housing during deploying and retracting of the car cover.

2. The Method of claim 1 further comprising selectively storing the car cover from a deployed state comprising:
a) grasping a free end of the trunk cover;
b) draping the trunk cover over the front cover until a mating fastener on the trunk cover is aligned with a mating fastener on the front cover;
c) positioning the fasteners into an engaged position;
d) opening the trunk;
e) rewinding the front cover with the attached rear cover into a housing a crank; and
f) closing the trunk.

3. The method of claim 1, wherein said housing has a slot the housing and parallel to said axle whereby said car cover can be extended and retracted therethrough.

4. The method of claim 3, wherein said rod is of a greater length than the housing slot to prevent the free end of the car cover from being wound into the housing.

5. The apparatus of claim 1, further comprising magnetic elements positioned within a base of the stand legs whereby the housing can be magnetically attached to an interior side of the trunk lid.

6. The method of claim 5, further comprising protective members capping the stand-legs and magnetic elements to prevent marring of the vehicle surface.

7. The method of claim 1, wherein the front cover and trunk cover having matingly engagable fasteners whereby the covers being of different lengths can be releasably fastened together during storage and releasably disengaged during use.

8. The method of claim 1, further comprising a first transparent member whereby an inspection sticker and a registration sticker of the vehicle are viewable and a second transparent member is situated so that a license plate of the vehicle is viewable.

9. The method of claim 1, wherein the car cover is manufactured from a heat reflective material.

* * * * *